(12) United States Patent
Gao (10) Patent No.: US 8,374,582 B2
(45) Date of Patent: Feb. 12, 2013

(54) ACCESS METHOD AND SYSTEM FOR CELLULAR MOBILE COMMUNICATION NETWORK

(75) Inventor: Bin Gao, Guangdong Province (CN)

(73) Assignee: ZTE Corporation, Hi-Tech Industrial Park, Nanshan District, Shenzhen, Guangdong Province (CN)

( * ) Notice: Subject to any disclaimer, the term of this patent is extended or adjusted under 35 U.S.C. 154(b) by 0 days.

(21) Appl. No.: 13/257,650

(22) PCT Filed: Dec. 11, 2009

(86) PCT No.: PCT/CN2009/075505
§ 371 (c)(1),
(2), (4) Date: Dec. 18, 2011

(87) PCT Pub. No.: WO2010/148609
PCT Pub. Date: Dec. 29, 2010

(65) Prior Publication Data
US 2012/0100833 A1    Apr. 26, 2012

(30) Foreign Application Priority Data

Jun. 25, 2009   (CN) .......................... 2009 1 0148675

(51) Int. Cl.
*H04M 3/16* (2006.01)
(52) U.S. Cl. ...................................................... 455/411
(58) Field of Classification Search .................. 455/411, 455/63.1, 63.3, 414.2, 504, 522, 426.1, 432.1; 370/338, 331, 328
See application file for complete search history.

(56) References Cited

U.S. PATENT DOCUMENTS

2004/0255037 A1* 12/2004 Corvari et al. ................ 709/229
2009/0013378 A1*  1/2009 Zhang et al. ...................... 726/1

FOREIGN PATENT DOCUMENTS

| CN | 1949709 A   | 4/2007 |
| CN | 101198181 A | 6/2008 |
| CN | 101272616 A | 9/2008 |

OTHER PUBLICATIONS

Huang, Zhenhai et al. Review of WLAN Authentication and Privacy Infrastructure (WAPI) Mobile Communication May 2006.
International Search Report for PCT/CN2009/075505 dated Mar. 8, 2010.

* cited by examiner

*Primary Examiner* — Kiet Doan
(74) *Attorney, Agent, or Firm* — Ling Wu; Stephen Yang; Ling and Yang Intellectual Property LLC (57) ABSTRACT

A method and system for accessing a cellular mobile communication network, the method includes: after a terminal and a base station complete a ranging process, the terminal carrying out a basic capability negotiation with the base station, the base station and the terminal carrying out a WAPI access authentication process; and the terminal carrying out a subsequent access flow to access the cellular mobile communication network; wherein the WAPI access authentication process includes: the terminal sending an access authentication request packet, including a certificate and a signature of the terminal, to the base station; the base station authenticating the signature of the terminal, including the certificate into a certificate authentication request packet to send to an authentication server to perform validation; the base station sending an access authentication response packet to the terminal, and carrying out a unicast session key negotiation with the terminal to obtain a unicast session key.

12 Claims, 3 Drawing Sheets

ACCESS METHOD AND SYSTEM FOR CELLULAR MOBILE COMMUNICATION NETWORK

TECHNICAL FIELD

The present invention relates to the communication field, and particularly, to a method and system for accessing a cellular mobile communication network.

BACKGROUND OF THE RELATED ART

WLAN Authentication Privacy Infrastructure (WAPI) is a kind of access authentication protocols applied in the Wireless Local Area Networks (WLAN) system. The WAPI applies the access control method based on the tri-element peer authentication in the wireless local area network field, which ensures the legal Mobile Terminal (MT) accesses the network through the legal Access Point (AP) and implements the privacy communication between the mobile terminal and the access point.

The WLAN security network based on the WAPI protocol is composed by three entities of the Authentication Supplicant Entity (ASUE, which usually resides in the mobile terminal), the Authenticator Entity (AE, which usually resides in the access point) and the Authentication Service Entity (ASE, which usually resides in the authentication server), and takes use of the public key system to complete the bidirectional authentication between the mobile terminal and the access point, the mobile terminal and AP use the elliptic curve cryptography algorithm to negotiate the session key in the authentication process, and use the encryption algorithm specified by the national cipher administration department to complete the encryption in the communication process, which has a very high security. At the same time, the WAPI further supports to update the session key after a period of time or after transmitting a certain amount of data packets in the communication process, which greatly improves the security of the data transmission.

According to the WAPI protocol, the authentication server (AS) is responsible for processing such as issuing, validating and revoking certificates and so on, and both of the mobile terminal (MT) and the wireless access point (AP) install the public key certificate issued by the AS to act as their own digital identification certificates. After the mobile terminal associating with the AP, and before using or accessing the network, the mobile terminal and the AP should validate both identification through the authentication server, and according to the validation result, only the mobile terminal holding the legal certificate is able to access the AP holding the valid certificate, and that is to say the mobile terminal holding the legal certificate is able to access the network through the AP, which not only can prevent the illegal mobile terminal from accessing the AP to access the network and occupying the network resources, but also can prevent the illegal mobile terminal from accessing the illegal AP to cause the information leakage.

In the next generation cellular mobile communication network system based on the Internet Protocol (IP), such as the in the systems of the Worldwide Interoperability for Microwave Access (WiMAX), Long Term Evolution (LTE) and so on, the access authentication is completed by one Authentication Authorization Accounting (AAA) server or a group of AAA servers separately configured by the network side, and the AAA server can carry out unidirectional authentication on the terminal or carry out bidirectional authentication with the terminal based on the Extensible Authentication Protocol (EAP).

At present, there are great many operators have the cellular mobile communication network system based on the IP and the wireless local area network system at the same time, since different authentication mechanisms should be used regarding to different systems, operators should deploy different types of authentication servers, which increases the hardware cost of the operator, and also is bad for the network convergence, service convergence and the integration management of the network and service at the same time.

At the same time, with the popularization of the dual mode terminal, if the same access authentication mechanism can be used to access the cellular wireless communication system and the wireless local area network system, it can configure single access authentication module in the dual mode terminal so as to reduce the hardware and software cost of the dual mode terminal and be prone to implement the handover among different access networks.

Taking the WAPI as the unified authentication mechanism of the cellular mobile communication network system and the wireless local area network system is a practicable scheme for satisfying the above demand of the operator and user. However, the prior art has not had a technical scheme for implementing the WAPI in the cellular mobile communication system based on the IP yet.

SUMMARY OF THE INVENTION

The technical problem to be solved in the present invention is to overcome the drawback in the prior art and to provide a method and a system for accessing a cellular mobile communication network so as to implement the WAPI access authentication in the IP-based cellular wireless communication system.

In order to solve the above problem, the present invention provides a method for accessing a cellular mobile communication network, and the method comprises:

after a terminal and a base station complete a ranging process, the terminal carrying out a basic capability negotiation with the base station, after completing the basic capability negotiation process, the base station and the terminal carrying out a wireless local area network authentication privacy infrastructure (WAPI) access authentication process; and after completing the access authentication process, the terminal carrying out a subsequent access flow to access the cellular mobile communication network;

wherein said WAPI access authentication process comprises:

the terminal sending an access authentication request packet to the base station, wherein the packet includes: a certificate of the terminal and a signature of the terminal;

after receiving the access authentication request packet, the base station authenticating the signature of the terminal, after authenticating the signature successfully, the base station including the certificate of the terminal into a certificate authentication request packet to send to an authentication server to perform validation;

after successfully validating the certificate of the terminal, the base station sending an access authentication response packet to the terminal, and carrying out a unicast session key negotiation with the terminal to obtain a unicast session key.

Furthermore, said certificate authentication request packet further includes a certificate of the base station;
said WAPI access process further comprises:
the authentication server validating the certificate of said base station, and sending a certificate validation result and a signature of the authentication server to the terminal through the base station;
the terminal judging whether the certificate of the base station is validated successfully according to said certificate validation result and said signature of the authentication server.

Furthermore, said method further has following characteristics:
before sending said access authentication request packet, the terminal further generates a temporary public key px and a temporary private key sx for an Elliptic Curve Diffie-Hellman (ECDH) exchange, and includes said px into said access authentication request packet to send to the base station;
after successfully validating the certificate of the terminal, the base station further generates a temporary private key sy and a temporary public key py for the ECDH exchange, uses said px and sy to carry out an ECDH calculation to obtain a basic key BK, and includes said py into said access authentication response packet to send to the terminal;
after receiving said access authentication response packet, the terminal uses said py and sx to carry out the ECDH calculation to generate the basic key BK;
the terminal and the base station use said basic key BK to carry out the unicast session key negotiation to obtain said unicast session key.

Furthermore, the terminal and the base station use a following way to carry out said basic capability negotiation:
the terminal sending a basic capability request message to the base station, wherein the message includes information of whether the terminal supporting information of the WAPI access authentication;
the base station judging whether to start up said WAPI access authentication process with the terminal according to said information included in the basic capability request message.

Furthermore, the terminal and the base station use a following way to carry out the unicast session key negotiation to obtain the unicast session key:
the base station generating a random number $N_1$ and a temporary private key sy and a temporary public key py for an ECDH exchange, and sending a unicast key negotiation request packet to the terminal, wherein the packet includes said $N_1$ and py;
after receiving said unicast key negotiation request packet, the terminal generating a random number $N_2$ and a temporary private key sx and a temporary public key px for the ECDH exchange, carrying out an ECDH calculation on the py and sx to obtain the basic key BK, and using the basic key BK, said $N_1$ and $N_2$ to generate said unicast session key;
the terminal sending a unicast key negotiation response packet to the base station, wherein the packet includes said $N_2$ and px;
after receiving said unicast key negotiation response packet, the base station carrying out the ECDH calculation on the px and sy to obtain the basic key BK, and using the basic key BK, said $N_1$ and $N_2$ to generate said unicast session key.

The present invention further provides a base station for supporting to access a cellular mobile communication network, and said base station is configured to:
after completing a ranging process with a terminal, carry out a basic capability negotiation with said terminal;
after completing the basic capability negotiation process, receive an access authentication request packet sent by said terminal, wherein the packet includes: a certificate of the terminal and a signature of the terminal;
after receiving said access authentication request packet, authenticate said signature of the terminal, after authenticating the signature successfully, include the certificate of the terminal into a certificate authentication request packet to send to an authentication server to perform validation;
after the authentication server successfully validates the certificate of the terminal, send an access authentication response packet to the terminal, and carry out a unicast session key negotiation with the terminal; and
after completing the unicast session key negotiation, interact with the terminal, and complete a subsequent access flow to make the terminal to access the cellular mobile communication network.

Furthermore, said base station can be further configured to: after the authentication server successfully validates the certificate of the terminal, generate a temporary private key sy and a temporary public key py for an ECDH exchange, use said px and sy to carry out an ECDH calculation to generate a basic key BK, and include said py into said access authentication response packet to send to said terminal.

Furthermore, said base station can be further configured to: judge whether to start up a WAPI access authentication process with said terminal according to information for identifying whether said terminal supports the WAPI access authentication included in a basic capability request message sent by said terminal in the basic capability negotiation process.

The present invention further provides a terminal for supporting to access a cellular mobile communication network, and said terminal is configured to:
after completing a ranging process with a base station, carry out a basic capability negotiation with the base station;
after completing the basic capability negotiation process, send an access authentication request packet to said base station, wherein the packet includes: a certificate of the terminal and a signature of the terminal;
after an authentication server successfully validates said certificate of the terminal, receive an access authentication response packet sent by the base station to said terminal, and carry out a unicast session key negotiation with said base station; and
after completing the unicast session key negotiation, interact with the base station, and complete a subsequent access flow to access the cellular mobile communication network.

Furthermore, said terminal can be further configured to: before sending said access authentication request packet, generate a temporary public key px and a temporary private key sx for an Elliptic Curve Diffie-Hellman (ECDH) exchange, comprise said px into said access authentication request packet to send to said base station; and after receiving said access authentication response packet, use said py and sx to carry out an ECDH calculation to obtain a basic key BK.

The present invention further provides an authentication server for supporting to access a cellular mobile communication network, and said authentication server is configured to: validate a certificate of a terminal, validate a certificate of a base station, and send a validation result of the certificate of the base station and a signature of the authentication server to the terminal through the base station.

The present invention further provides an system for accessing a cellular mobile communication network, and the system comprises: the base station as mentioned above, the terminal as mentioned above, and the authentication server as mentioned above; wherein, said base station and said terminal are configured to use a following way to carry out a unicast session key negotiation to obtain a unicast session key:

said base station generating a random number $N_1$, and a temporary private key sy and a temporary public key py for an ECDH exchange, and sending a unicast key negotiation request packet to said terminal, wherein the packet comprises said $N_1$ and py;

after receiving said unicast key negotiation request packet, said terminal generating a random number $N_2$, and a temporary private key sx and a temporary public key px for the ECDH exchange, carrying out an ECDH calculation on the py and sx to obtain a basic key BK, using the basic key BK, said $N_1$ and $N_2$ to generate the unicast session key;

said terminal sending a unicast key negotiation response packet to the base station, wherein the packet comprises said $N_2$ and px;

after receiving said unicast key negotiation response packet, said base station carrying out the ECDH calculation on the px and sy to obtain the basic key BK, and using the basic key BK, said $N_1$ and $N_2$ to generate said unicast session key.

As a conclusion, the present invention takes the base station as the AE in the WAPI protocol, takes the cellular mobile communication terminal as the ASUE in the WAPI protocol, implements the WAPI-based access authentication in the cellular mobile communication network system, and reduces the cost of the operation and management of the operator.

PREFERRED EMBODIMENTS OF THE PRESENT INVENTION

The core concept of the present invention is: taking the base station as the AE in the WAPI protocol, taking the cellular mobile communication terminal as the ASUE in the WAPI protocol, and implementing the access authentication based on the WAPI in the cellular mobile communication network system.

Besides, in order to maintain the compatibility, the original access authentication way should be maintained in the cellular mobile communication network system, and thus the base station should judge whether the terminal supports the WAPI protocol and start the corresponding access authentication way according to the judgment result.

Below it will describe the present invention with reference to the figures and examples in detail.

Figure 1:
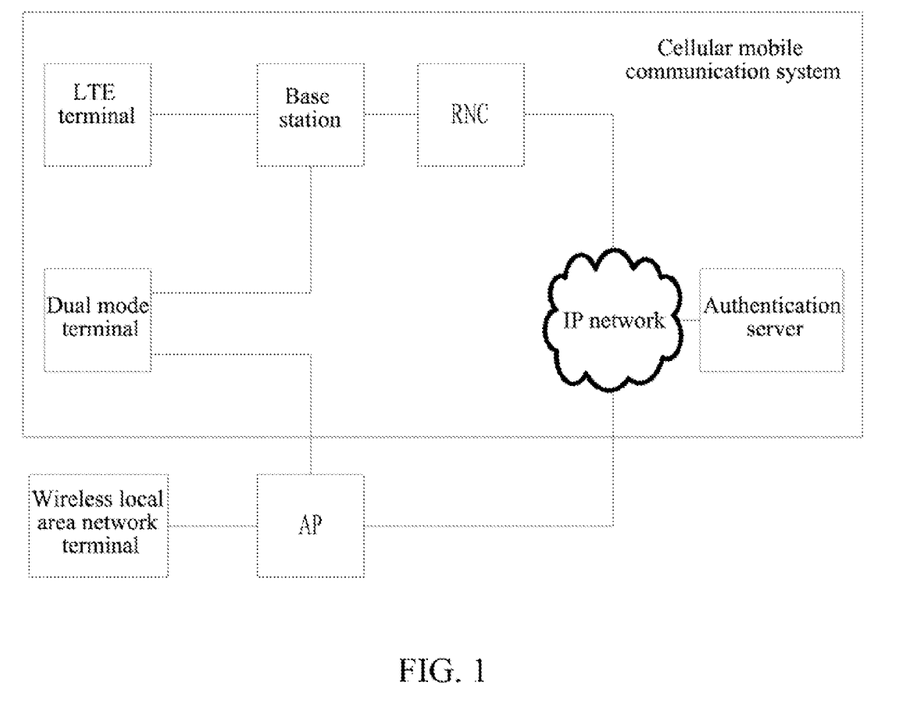
FIG. 1 is a structure schematic diagram of the cellular mobile communication network system and the wireless local area network system which use the WAPI as the access authentication protocol in union.

FIG. 1 is a structure schematic diagram of the cellular mobile communication network system and the wireless local area network system which use the WAPI as the access authentication protocol in union; as shown in FIG. 1, when the WAPI is used as the access authentication protocol in the cellular mobile communication network system, the cellular mobile communication network system and the wireless local area network system can use the same authentication server in common.

Below it will describe the functions of the terminal, base station and authentication server and the message interacting relationship among each other in the process of the terminal accessing the network in the cellular mobile communication network system in detail. The process of the terminal accessing the network in the wireless local area network system is the same with that in prior art, and it will be omitted in this text.

Figure 2:
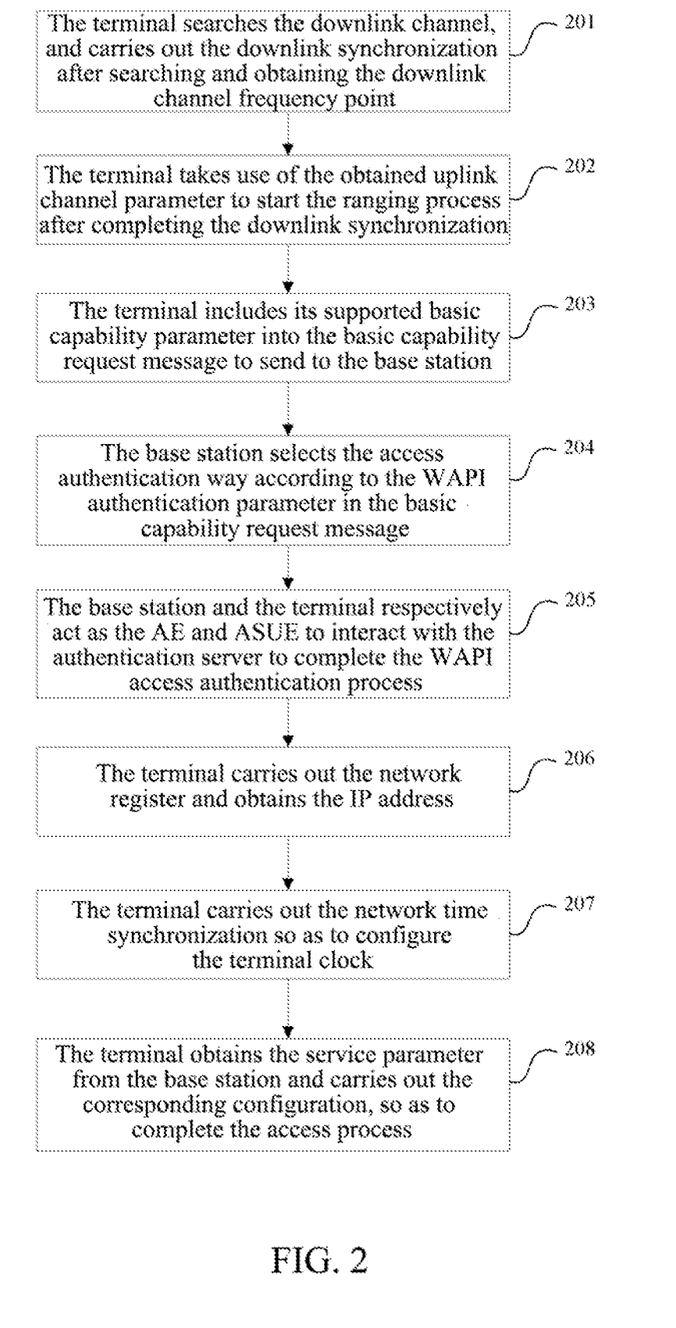
FIG. 2 is a flow chart of the method for accessing the LTE network according to the example of the present invention.

FIG. 2 is a flow chart of the method for accessing the LTE network according to the example of the present invention, which particularly comprises following steps:

201, the LTE terminal searches the downlink channel, and carries out the downlink synchronization after searching and obtaining the downlink channel frequency point;

202, the LTE terminal takes use of the obtained uplink channel parameter to start the ranging process after completing the downlink synchronization;

203, the LTE terminal includes its supported basic capability parameter into the SS Basic Capability Request (SBC-REQ) message to send to the base station according to the information obtained in the ranging so as to start the basic capability negotiation process;

if the LTE terminal supports the EAP and WAPI at the same time, the above basic capability parameter includes the WAPI authentication parameter and the EAP authentication parameter.

The WAPI authentication parameter includes: the WLAN Authentication Infrastructure (WAI) authentication and key management way supported by the LTE terminal, and the unicast encryption algorithm supported by the LTE terminal and so on, and the particular description is as follows:

the WAI authentication and key management way includes following two types: the WAI certificate authentication and key management way and the WAI pre-shared key authentication and key management way;

wherein if the WAI certificate authentication and key management way is used, the LTE terminal should provide the digital certificate to the base station, interact with the base station and the authentication server to complete the certificate authentication process, and negotiates the Basic Key (BK) in the certificate authentication process; if the WAI pre-shared key authentication and key management way is used, the LTE terminal does not need to carry out the certificate authentication process, and the basic key is directly derived by the pre-shared key of the LTE terminal and the base station.

The unicast key algorithm includes one or more unicast encryption algorithms supported by the LTE terminal; such as the SMS4 algorithm and so on;

the authentication server list field includes the identifier of the authentication server supported (trusted) by the LTE terminal.

204, after receiving the SS Basic Capability Request (SBC-REQ) message, the base station judges whether the basic capability request message includes the WAPI authentication parameter:

if the basic capability request message does not include the WAPI authentication parameter, the base station obtains that this LTE terminal does not support the WAPI, and therefore returns the SS Basic Capability Response (SBC-RSP) message including the EAP authentication parameter to the LTE terminal, uses the EAP authentication way in the prior art to authenticate the LTE terminal in the subsequent steps, and completes the subsequent access process, and this flow ends;

if the basic capability request message includes the WAPI authentication parameter, then the base station judges whether the base station supports the WAPI authentication parameter provided by the terminal, if does not support, then returns the SS Basic Capability Response (SBC-RSP) message including the EAP authentication parameter to the LTE terminal, uses the EAP authentication way in the prior art to authenticate the LTE terminal in the subsequent steps, and completes the subsequent access process, and this flow ends; if the base station supports the WAPI authentication parameter provided by the terminal, then returns the SS Basic Capability Response (SBC-RSP) message including the finally selected WAPI authentication parameter (including the WAI authentication and key management way and the unicast encryption algorithm selected by the base station) to the LTE terminal, and uses the WAPI access authentication way to carry out the access authentication on the LTE terminal in the subsequent steps.

The base station supporting the WAPI authentication parameter provided by the terminal refers that: the base station supports one or more types of authentication and key management ways included in the WAPI authentication parameter provided by the terminal; and the base station supports one or more types of unicast encryption algorithms included in the WAPI authentication parameter provided by the terminal; and the base station can forward the subsequent certificate authentication request to the authentication server trusted by the LTE terminal.

It should be noted that although the WAPI protocol includes the WAI pre-shared key authentication and key management way, the security of this way is worse, the pre-shared key of each terminal should be configured in the base station in advance, and thus the base station usually does not support this type of authentication and key management ways. That is to say if the WAPI authentication parameter provided by the terminal does not include the WAI certificate key authentication and key management way, the base station usually will select the EAP authentication way to complete the access authentication with the LTE terminal.

Figure 3:
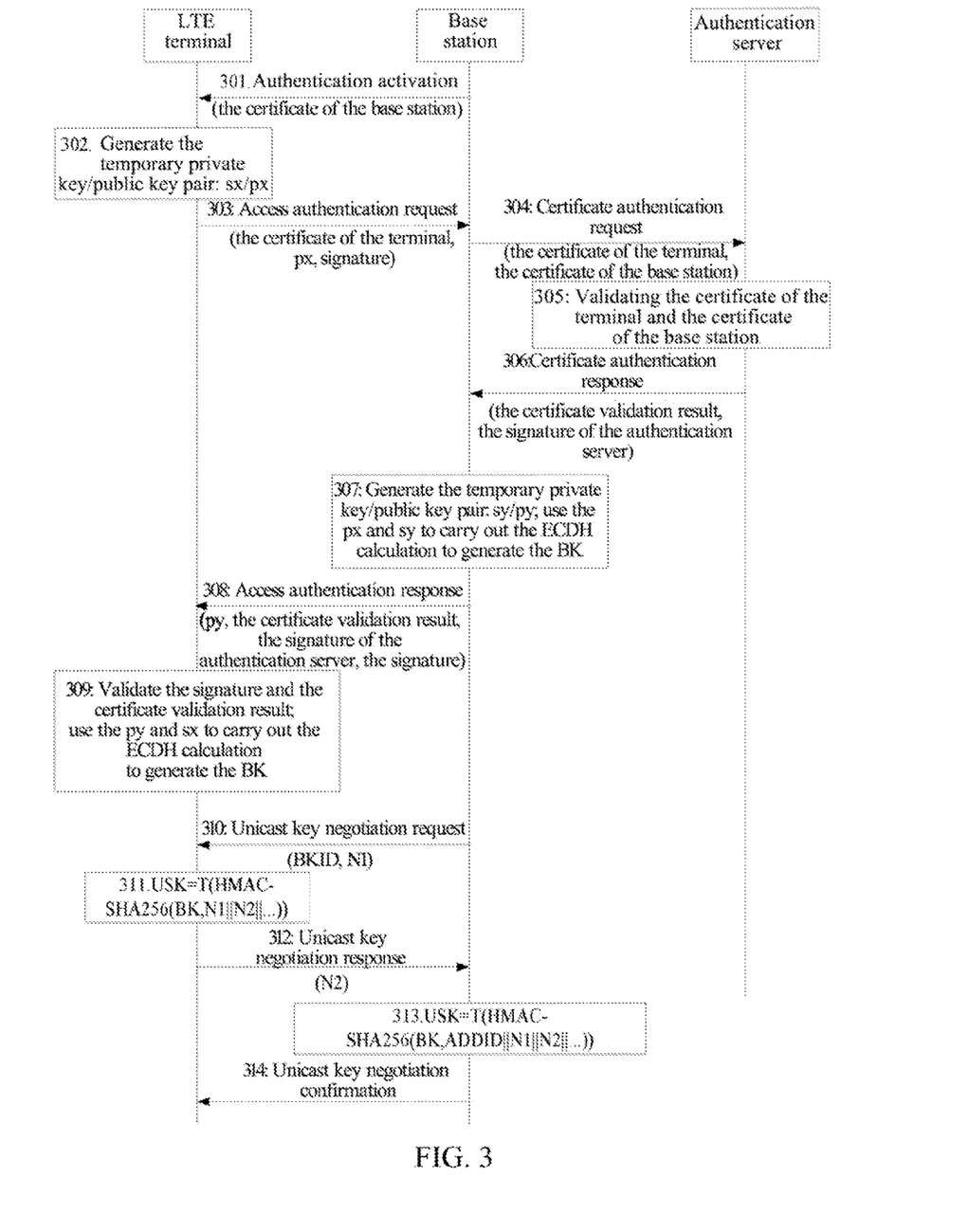
FIG. 3 is a flow chart of the method for the LTE terminal interacting with the base station and the authentication server to complete the WAPI access authentication.

205, if the LTE terminal supports the WAPI access authentication way and the base station supports the WAPI authentication parameter provided by the terminal, then the base station and the LTE terminal respectively act as the AE and ASUE in the WAPI protocol to interact with the authentication server to complete the WAPI access authentication process;

the particular steps of the WAPI access authentication process is as shown in FIG. 3, which will be described in detail in the following text.

206, the LTE terminal carries out the network register after completing the WAPI access authentication, and then starts the Dynamic Host Configuration Protocol (DHCP) process so as to obtain the IP address;

207, the LTE terminal attempts to carry out the network time synchronization so as to configure the terminal clock after obtaining network layer configuration such as the IP address, gateway, Domain Name System (DNS) and so on through the DHCP process;

208, the LTE terminal obtains the service parameter from the base station and carries out corresponding configuration, and completes the access process.

FIG. 3 is a flow chart of the method for the LTE terminal interacting with the base station and the authentication server to complete the WAPI access authentication, and the method for the WAPI access authentication comprises two parts of: a certificate authentication process (steps 301~309) and a unicast key negotiation process (steps 310~314), which particularly comprises following steps:

301, the base station sends the authentication activation packet to the LTE terminal, and initiates the certificate authentication process;

the authentication activation packet can include: fields such as the certificate of the base station and so on.

302, the LTE terminal stores the certificate of the base station after receiving the authentication activation packet, and generates a temporary private key sx and a temporary public key px for the Elliptic Curve Diffie-Hellman (ECDH) exchange;

303, the LTE terminal generates the access authentication request packet, and sends the access authentication request packet to the base station;

the access authentication request packet includes fields such as the temporary public key px and the certificate of the LTE terminal and so on, and the signature value on the above fields by the LTE terminal.

304, the base station validates the signature of the LTE terminal (using the public key included in the certificate of the LTE terminal) after receiving the access authentication request packet, if the signature is validated unsuccessfully, the base station discards this packet; or else the base station generates the certificate authentication request packet, and sends the certificate authentication request packet to the authentication server trusted by both of the LTE terminal and the base station through the Radio Network Controller (RNC) and the IP network;

the certificate authentication request packet includes: the certificate of the LTE terminal and the certificate of the base station.

305, the authentication server validates the certificate of the LTE terminal and the certificate of the base station;

306, the authentication server constructs the certificate authentication response packet according to the validation result of the certificate of the LTE terminal and the certificate of the base station, and sends the certificate authentication response packet to the base station through the IP network and the RNC after attaching the signature of the authentication server;

307, the base station validates the signature of the authentication server, and further validates the validation result of the certificate of the LTE terminal after validating the signature of the authentication server successfully, and after the validating the validation result of the certificate of the LTE terminal successfully, carries out the following operations:

307a, generating a temporary private key sy and a temporary public key py for the ECDH exchange;

307b, using the temporary public key px sent by the LTE terminal and the locally generated temporary private key sy to carry out the ECDH calculation to generate the basic key BK.

308, the base station sends the access authentication response packet to the LTE terminal;

the access authentication response packet includes: the temporary public key py, the certificate validation result, the signature of the authentication server and the signature on the above fields by the base station.

309, the LTE terminal validates the signatures of the authentication server and the base station and the certificate validation result after receiving the access authentication response packet, if the signature is correct and the authentication server validating the certificate of the base station is success, then the LTE terminal uses the temporary public key py and the temporary private key sx to carry out the ECDH calculation to generate the BK.

It should be noted that the BKs generated by the LTE terminal and the base station are the same according to the ECDH principle.

So far, the LTE terminal and the base station complete the WAPI certificate authentication process, and negotiate and obtain the basic key BK in this process; afterwards, the LTE terminal and the base station can use the BK to carry out the unicast key negotiation to generate the unicast session key, which particularly comprises following steps:

310, the base station sends the unicast key negotiation request packet to the LTE terminal;

the unicast key negotiation request packet includes: parameters such as the BKID and $N_1$ and so on, wherein the BKID is the identifier of the basic key BK obtained by the previous negotiation of the base station and the LTE terminal;

the $N_1$ is the random number generated by the base station.

311, the LTE terminal generates the random number $N_2$ after receiving the unicast key negotiation request packet, and then calculates:

$$Key=KD\text{-}HMAC\text{-}SHA256(BK, N_1\|N_2\|String),$$
wherein the BK is the basic key identified by the above BKID; the KD-HMAC-SHA256 is the Hashed Message Authentication Code (HMAC) algorithm based on the SHA256 algorithm, and that is a kind of HASH algorithms with the key (taking the BK as the key); String is a character string configured in advance; "$\|$" denotes the character concatenation operation, and "$\|N_1\|N_2\|String$" is the character parameter used by the KD-HMAC-SHA256 algorithm.

The LTE terminal takes a part of Key (for example the former 16 bytes) as the unicast session key USK after calculating and obtaining the Key. T(•) in FIG. 1 denotes the operation of extracting (or called as truncating) parts of the character string from Key.

312, the LTE base station sends the unicast key negotiation response packet to the base station;

the unicast key negotiation response packet includes: parameters such as the BKID and the random number $N_2$ and so on.

313, after receiving the unicast key negotiation response packet, the base station calculates:

$$Key=KD\text{-}HMAC\text{-}SHA256(BK, \|N_1\|N_2\|String), \text{ and}$$
extracting the USK therefrom.

314, the base station sends the unicast key negotiation confirmation packet to the LTE terminal, and ends the unicast key negotiation flow.

So far, the base station and the LTE terminal complete the WAPI certificate authentication and unicast key negotiation process.

It can be obtained from the above that when the base station uses the above way to carry out the access authentication on the LTE terminal, the authentication server can provide services for the cellular mobile communication network system and the wireless local area network system at the same time, and reduce the operating cost of the operator.

It should be noted that the above access authentication method of the present invention is further suitable for other cellular mobile communication network systems besides the LTE.

The above examples can further have a plurality of transformations according to the basic principle of the present invention, for example:

(1) considering the difference of the cellular mobile communication network system and the wireless local area network system, the probability of configuring the illegal base station (the fake base station) is smaller, and thus the terminal can carry out the certificate authentication not on the base station; namely, the authentication activation packet in step 301 can exclude the certificate of the base station; the certificate authentication request packet in step 304 can exclude the certificate of the base station; the step 305 either does not need to validate the certificate of the base station; and the access authentication response packet in step 308 also can exclude the certificate validation result.

(2) in the above examples, the base station judges whether the terminal supports the WAPI according to the WAPI authentication parameter included in the basic capability request message sent by the terminal; in other examples of the present invention, the terminal can add one identifier (which can act as the WAPI identifier) in the basic capability request message to notify the base station whether the terminal supports the WAPI, in this case, the base station and the terminal use the default WAPI parameter (for example using the WAI certificate authentication and key management way and the SMS4 unicast encryption algorithm) to carry out the WAPI access authentication and encrypt and decrypt the subsequent data; or when the basic capability negotiation is completed, the base station directly sends the authentication activation packet to the terminal, and sets the timer, and if the access authentication request packet sent by the terminal is not received when the timer is time out, then it is considered that the terminal does not support the WAPI, and further the EAP access authentication is carried out with the terminal.

(3) in the above examples, the base station and the terminal exchange the EDCH temporary public keys in the WAPI certificate authentication process, and negotiate and generate the basic key BK, of which the advantage is that the message interacting is reduced;

in other examples of the present invention, it can only complete the exchange and validation of the certificates in the WAPI certificate authentication process, further carry out the exchange of the ECDH temporary public keys after the certificate is validated successfully, and negotiate and generate the basic key BK. For example:

the unicast key negotiation request packet in step 310 includes the random number $N_1$ and the temporary public key py of the base station, and the signature value of the above fields;

in step 311, the terminal generates the random number $N_2$, the temporary public key px and a temporary private key sx, and uses the py and sx to carry out the ECDH calculation, generates the basic key BK, and then uses the basic key BK and random numbers $N_1$ and $N_2$ to generate the unicast session key USK;

in step 312, the terminal includes the temporary public key px and random number $N_2$ all together into the unicast key negotiation response packet to send to the base station;

in step 313, the base station firstly uses the px and sy to generate the BK, and then uses the basic key BK and the random numbers $N_1$ and $N_2$ to generate the unicast session key USK.

INDUSTRIAL APPLICABILITY

The present invention takes the base station as the AE in the WAPI protocol, takes the cellular mobile communication terminal as the ASUE in the WAPI protocol, implements the access authentication based on the WAPI in the cellular mobile communication network system, and reduces the cost of the operating and management of the operator.

What is claimed is:

1. A method for accessing a cellular mobile communication network, comprising:

after a terminal and a base station complete a ranging process, the terminal carrying out a basic capability negotiation with the base station, after completing the basic capability negotiation process, the base station and the terminal carrying out a wireless local area network authentication privacy infrastructure (WAPI) access authentication process; and after completing the access authentication process, the terminal carrying out a subsequent access flow to access the cellular mobile communication network;

wherein said WAPI access authentication process comprises:

the terminal sending an access authentication request packet to the base station, wherein the packet comprises: a certificate of the terminal and a signature of the terminal;

after receiving the access authentication request packet, the base station authenticating the signature of the terminal, after authenticating the signature successfully, the base station comprising the certificate of the terminal into a certificate authentication request packet to send to an authentication server to perform validation;

after successfully validating the certificate of the terminal, the base station sending an access authentication response packet to the terminal, and carrying out a unicast session key negotiation with the terminal to obtain a unicast session key;

wherein, before the step of the terminal sending the access authentication request packet to the base station, said WAPI access authentication process further comprises: the terminal generating a temporary public key px and a temporary private key sx for an Elliptic Curve Diffie-Hellman (ECDH) exchange;

said access authentication request packet further comprises said px;

after the step of successfully validating the certificate of the terminal, said WAPI access authentication process further comprises: the base station generating a temporary private key sy and a temporary public key py for the ECDH exchange, and using said px and sy to carry out an ECDH calculation to obtain a basic key BK;

said access authentication response packet comprises said py;

said WAPI access authentication process further comprises: the terminal using said py and sx to carry out the ECDH calculation after receiving said access authentication response packet to obtain said basic key BK;

in the step of carrying out the unicast session key negotiation with the terminal, the terminal and the base station use said basic key BK to negotiate and obtain said unicast session key.

2. The method as claimed in claim 1, wherein, said certificate authentication request packet further comprises a certificate of the base station;

said WAPI access process further comprises:

the authentication server validating the certificate of said base station, and sending a certificate validation result and a signature of the authentication server to the terminal through the base station;

the terminal judging whether the certificate of the base station is validated successfully according to said certificate validation result and said signature of the authentication server.

3. The method as claimed in claim 1, wherein, the step of carrying out the basic capability negotiation with the base station comprises:

the terminal sending a basic capability request message to the base station, wherein the message comprises information of whether the terminal supporting information of the WAPI access authentication;

the base station judging whether to start up said WAPI access authentication process with the terminal according to said information comprised in the basic capability request message.

4. The method as claimed in claim 1, wherein, the step of carrying out the unicast session key negotiation with the terminal to obtain the unicast session key comprises:

the base station generating a random number $N_1$ and a temporary private key sy and a temporary public key py for an ECDH exchange, and sending a unicast key negotiation request packet to the terminal, wherein the packet comprises said $N_1$ and py;

after receiving said unicast key negotiation request packet, the terminal generating a random number $N_2$ and a temporary private key sx and a temporary public key px for the ECDH exchange, carrying out an ECDH calculation on the py and sx to obtain the basic key BK, and using the obtained basic key BK, said $N_1$ and $N_2$ to generate said unicast session key;

the terminal sending a unicast key negotiation response packet to the base station, wherein the packet comprises said $N_2$ and px;

after receiving said unicast key negotiation response packet, the base station carrying out the ECDH calculation on the px and sy to obtain said basic key BK, and using said basic key BK, said $N_1$ and $N_2$ to generate said unicast session key.

5. A base station for supporting to access a cellular mobile communication network, wherein said base station is configured to:

after completing a ranging process with a terminal, carry out a basic capability negotiation with said terminal;

after completing the basic capability negotiation process, receive an access authentication request packet sent by said terminal, wherein the packet comprises: a certificate of the terminal and a signature of the terminal;

after receiving said access authentication request packet, authenticate said signature of the terminal, after authenticating the signature successfully, comprise the certificate of the terminal into a certificate authentication request packet to send to an authentication server to perform validation;

after the authentication server successfully validates the certificate of the terminal, send an access authentication response packet to the terminal, and carry out a unicast session key negotiation with the terminal; and after completing the unicast session key negotiation, interact with the terminal, and complete a subsequent access flow to make the terminal to access the cellular mobile communication network;

wherein, said base station is further configured to: after the authentication server successfully validates the certificate of the terminal, generate a temporary private key sy and a temporary public key py for an ECDH exchange, use said px and sy to carry out an ECDH calculation to obtain a basic key BK, and comprise said py into said access authentication response packet to send to said terminal.

6. The base station as claimed in claim 5, wherein, said base station is further configured to: judge whether to start up a WAPI access authentication process with said terminal according to information for identifying whether said terminal supports the WAPI access authentication comprised in a basic capability request message sent by said terminal in the basic capability negotiation process.

7. A terminal for supporting to access a cellular mobile communication network, wherein said terminal is configured to:

after completing a ranging process with a base station, carry out a basic capability negotiation with the base station;

after completing the basic capability negotiation process, send an access authentication request packet to said base station, wherein the packet comprises: a certificate of the terminal and a signature of the terminal;

after an authentication server successfully validates said certificate of the terminal, receive an access authentication response packet sent by the base station to said terminal, and carry out a unicast session key negotiation with said base station; and after completing the unicast session key negotiation, interact with the base station, and complete a subsequent access flow to access the cellular mobile communication network;

wherein, said terminal is further configured to: before sending said access authentication request packet, generate a temporary public key px and a temporary private key sx for an Elliptic Curve Diffie-Hellman (ECDH) exchange, comprise said px into said access authentication request packet to send to said base station; and after receiving said access authentication response packet use said py and sx to carry out an ECDH calculation to obtain a basic key BK.

8. A system for accessing a cellular mobile communication network, comprising: a base station, a terminal, and a authentication server; wherein, said base station is configured to:

after completing a ranging process with a terminal, carry out a basic capability negotiation with said terminal;

after completing the basic capability negotiation process, receive an access authentication request packet sent by said terminal, wherein the packet comprises: a certificate of the terminal and a signature of the terminal;

after receiving said access authentication request packet, authenticate said signature of the terminal, after authenticating the signature successfully, comprise the certificate of the terminal into a certificate authentication request packet to send to an authentication server to perform validation;

after the authentication server successfully validates the certificate of the terminal, send an access authentication response packet to the terminal, and carry out a unicast session key negotiation with the terminal; and after completing the unicast session key negotiation, interact with the terminal, and complete a subsequent access flow to make the terminal to access the cellular mobile communication network;

said terminal is configured to:

after completing a ranging process with a base station, carry out a basic capability negotiation with the base station;

after completing the basic capability negotiation process, send an access authentication request packet to said base station, wherein the packet comprises: a certificate of the terminal and a signature of the terminal;

after an authentication server successfully validates said certificate of the terminal, receive an access authentication response packet sent by the base station to said terminal, and carry out a unicast session key negotiation with said base station; and after completing the unicast session key negotiation, interact with the base station, and complete a subsequent access flow to access the cellular mobile communication network; and said authentication server is configured to: validate a certificate of a terminal, validate a certificate of a base station, and send a validation result of the certificate of the base station and a signature of the authentication server to the terminal through the base station;

said base station and said terminal are configured to use a following way to carry out a unicast session key negotiation to obtain a unicast session key:

said base station generating a random number $N_1$, and a temporary private key sy and a temporary public key py for an ECDH exchange, and sending a unicast key negotiation request packet to said terminal, wherein the packet comprises said $N_1$ and py;

after receiving said unicast key negotiation request packet, said terminal generating a random number $N_2$, and a temporary private key sx and a temporary public key px for the ECDH exchange, carrying out an ECDH calculation on the py and sx to obtain a basic key BK, using the basic key BK, said $N_1$ and $N_2$ to generate the unicast session key;

said terminal sending a unicast key negotiation response packet to the base station, wherein the packet comprises said $N_2$ and px;

after receiving said unicast key negotiation response packet, said base station carrying out the ECDH calculation on the px and sy to obtain the basic key BK, and using the basic key BK, said $N_1$ and $N_2$ to generate said unicast session key.

9. The system as claimed in claim 8, wherein, said base station is further configured to: after the authentication server successfully validates the certificate of the terminal, generate a temporary private key sy and a temporary public key py for an ECDH exchange, use said px and sy to carry out an ECDH calculation to obtain a basic key BK, and comprise said py into said access authentication response packet to send to said terminal.

10. The system as claimed in claim 9, wherein, said base station is further configured to: judge whether to start up a WAPI access authentication process with said terminal according to information for identifying whether said terminal supports the WAPI access authentication comprised in a basic capability request message sent by said terminal in the basic capability negotiation process.

11. The system as claimed in claim 8, wherein, said base station is further configured to: judge whether to start up a WAPI access authentication process with said terminal according to information for identifying whether said terminal supports the WAPI access authentication comprised in a basic capability request message sent by said terminal in the basic capability negotiation process.

12. The system as claimed in claim 8, wherein,
said terminal is further configured to: before sending said access authentication request packet, generate a temporary public key px and a temporary private key sx for an Elliptic Curve Diffie-Hellman (ECDH) exchange, comprise said px into said access authentication request packet to send to said base station; and after receiving said access authentication response packet, use said py and sx to carry out an ECDH calculation to obtain a basic key BK.

\* \* \* \* \*